United States Patent
Dietsch et al.

(10) Patent No.: US 6,661,516 B1
(45) Date of Patent: Dec. 9, 2003

(54) VEHICLE TREATMENT INSTALLATION AND OPERATING METHOD

(75) Inventors: Wolfgang Dietsch, Franfurt (DE); Walter Klos, Luedenscheid (DE); Guenter Windel, Schoellkrippen-Schneppenbach (DE)

(73) Assignee: WashTec Holding GmbH, Augsburg (DE)

(*) Notice: Subject to any disclaimer, the term of this patent is extended or adjusted under 35 U.S.C. 154(b) by 0 days.

(21) Appl. No.: 09/701,129

(22) PCT Filed: May 25, 1999

(86) PCT No.: PCT/EP99/03577
§ 371 (c)(1),
(2), (4) Date: Jan. 26, 2001

(87) PCT Pub. No.: WO99/61295
PCT Pub. Date: Dec. 2, 1999

(30) Foreign Application Priority Data

| | | |
|---|---|---|
| May 26, 1998 | (DE) | 298 09 426 U |
| Nov. 5, 1998 | (DE) | 298 19 722 U |
| Feb. 24, 1999 | (DE) | 299 03 300 U |

(51) Int. Cl.⁷ .................................................. G01B 11/00
(52) U.S. Cl. ................................................ 356/399
(58) Field of Search ................................. 356/399, 400

(56) References Cited

U.S. PATENT DOCUMENTS 3,596,241 A * 7/1971 Migneault ............... 340/932.2

FOREIGN PATENT DOCUMENTS

| DE | G 92 15 013.6 | 2/1993 | | |
|---|---|---|---|---|
| DE | 4417864 A1 | * 11/1995 | ............. | B60S/3/04 |
| DE | 19639054 A1 | * 3/1998 | ............ | G09F/13/04 |
| DE | 297 23 828 U1 | 3/1999 | | |
| JP | 60 128047 | 7/1985 | | |
| JP | 01 297344 | 11/1989 | | |
| JP | 06 321067 | 11/1994 | | |
| JP | 08 119071 | 5/1996 | | |
| JP | 8-207713 | 8/1996 | | |
| JP | 08207713 | * 8/1996 | ............. | B60S/3/04 |
| JP | 10001032 A | * 1/1998 | ............. | B60S/3/06 |

* cited by examiner

Primary Examiner—Diane I. Lee
(74) Attorney, Agent, or Firm—Flynn, Thiel, Boutell & Tanis, P.C.

(57) ABSTRACT

The invention relates to an operating method and a vehicle treatment installation (1) comprising at least one portal (3) and a signaling device (7) for guiding the vehicle operator. The vehicle treatment installation (1) has a drive-in aid (19) which transmits to the vehicle operator optical direction and correcting instructions. The drive-in aid can, for example, generate optically visible guide lines (34) aligned along the direction of travel. It can also comprise a measurement device (12, 13) in the form of a sensor system or an optical detection system with cameras (24, 25), which detect and evaluate the position and alignment of the vehicle (2) when it is driven in and via a signaling device (7) transmit to the vehicle operator corresponding instructions (10) relative to the direction of travel.

27 Claims, 6 Drawing Sheets

VEHICLE TREATMENT INSTALLATION AND OPERATING METHOD

FIELD OF THE INVENTION

The invention relates to a method for operating a vehicle treatment installation and a vehicle treatment installation.

BACKGROUND OF THE INVENTION

Vehicle treatment installations, in particular portal washing installations, have in practice mechanical guide devices consisting of two guide rails on the floor, which guide rails are supposed to define the drive-in track laterally and, if necessary, are supposed to guide the vehicle wheels laterally. This mechanical guide aid is not sufficiently safe and is easily being rolled over by the vehicle wheels. Furthermore the rails form a trip threshold and can cause an accident for the vehicle operator when leaving and entering the vehicle. Furthermore a signaling device in the form of a signal with red and green lights is usually mounted on the portal. It indicates to the vehicle operator when he has driven sufficiently far under or in front of the portal and can park the vehicle. Incorrect positions of the vehicle, like a later shift or skewed positions, are thereby not detected. The light also does not give any instructions for corrections in the case of skewed positions. The known vehicle treatment installation does not meet the demands because of its limited guide and accident safety.

The DE-G-92 15 013 discloses a different drive-in aid for vehicles at garages having a manipulator which can be mechanically coupled with the vehicle and which moves the vehicle without the driver and automatically into the parking space. Such an arrangement is very expensive and cannot be utilized for vehicle washing installations because of the difficult surrounding conditions.

SUMMARY OF THE INVENTION

The purpose of the present invention is therefore to provide a better vehicle washing installation.

The vehicle washing installation of the invention has a drive-in aid which transmits optically visible direction and correction instructions to the vehicle operator. It safely and reliably guides the vehicle operator during his drive into the installation and enables him to avoid undesired skewed positions and other incorrect positions. The drive-in aid also takes away from insecure vehicle operators the fear regarding the correct driving into a vehicle washing installation.

Mechanical guide rails or other like guide devices engaging the vehicle itself are because of the drive-in aid not needed. With the elimination of such guide rails, accident prevention and also comfort in the vehicle washing installation can be improved.

The drive-in aid can be designed differently, for example, as a passive or active drive-in aid. The passive drive-in aid offers the vehicle operator at least one optically visible guide line on which he can orient himself like on a line of collimation when driving into the installation. He can thereby determine with the help of the guide line(s) and the vehicle position relative to the guide line, whether he drives in laterally shifted or skewed, and can correct his direction of travel accordingly. The guide line communicates through its stationary position to the vehicle operator on the one hand an instruction regarding the direction. On the other hand he receives an instruction regarding an incorrect position by a deviation of the guide line from the desired position, whereby the magnitude and direction of the deviation give an instruction for correction.

It is hereby advantageous when the guide line is aligned on the one hand essentially along the drive-in direction and on the other hand centrally with respect to the installation or in the area of the vehicle operator.

Of a particular advantage is to project the optic guide line(s) from above onto the vehicle and/or onto the floor of the installation. This makes it possible for the vehicle operator to see in front of himself on the floor the guide line(s) initially when driving in. In the installation he sees the guide line mainly on the hood of the car and on the windshield and can thereby very easily recognize whether he is off center with respect to the desired drive-in direction.

The drive-in aid has thereby the special advantage that it is suited for all vehicle dimensions alike and does not need any adjustments. Furthermore mechanical guide devices on the floor of the installation can be eliminated so that falls due to tripping no longer exist. An optic guide line is furthermore psychologically more advantageous because it does not produce any frightening impacts during direction deviations. The optic drive-in aid has in addition the advantage that it does not demand a great structural input and can also be retrofitted at any time.

It is possible in a further embodiment to utilize instead of one single guide line a plurality of lines or also a guide net. With this also optic three-dimensional guide actions can be achieved in such a manner that a three-dimensionally appearing funnel-shaped guide picture is projected onto the windshield in front of the vehicle operator. These light and/or picture effects can appear as a virtual drive-in aid.

He thereby receives through the signaling device steering instructions, with which he can correct incorrect positions during the positioning and aligning of the vehicle. In particular he can correct in this manner skewed positions or a lateral shift, which is too much, with respect to the drive-in track.

The active drive-in aid operates with one or several measurement devices which determine the position and alignment of the vehicle during driving in and in the final position, evaluate same in a suitable control system, and then transmit to the vehicle operator in the case of incorrect positions via a suitable signaling device the necessary steering aids through direction and correction instructions.

The measurement devices have in the one embodiment non-contact sensors, in particular optic sensors. In an improved and more complex embodiment, it is possible to utilize other optic detection systems, for example, camera systems or so-called vision systems. The measurement devices are particularly reliable and operate reliably and precisely even under the surrounding conditions existing in a vehicle washing installation. In particular the requirements for assembly, installation, service and operation are low in optic detection systems. They are also advantageous regarding costs.

The camera systems have the advantage that they can also be utilized for other purposes, in particular for contour detection and for controlling and/or monitoring the treatment process or the vehicle treatment installation. Furthermore camera systems are particularly inexpensive and reliable in operation. When only one drive-in aid is demanded, inexpensive systems with a low resolution and little requirements regarding the calculating capacity, which systems are oriented on the switched-on lights of the vehicle, are sufficient. Better camera systems with a higher resolution permit the aforementioned contour detection with the control and monitoring functions.

It is particularly advantageous in the case of the active drive-in aid when the signaling device can be positioned directly in front of the vehicle operator in the field of vision, for example, in the opening of the portal. This can be realized, for example, by arrangement on a liftable and lowerable roof nozzle of the washing installation. The signaling device can thus for guiding the operator be lowered directly into the range of vision in front of the vehicle operator and can again be removed for the following treatment process or also for exiting. Furthermore sufficient space is available on the roof treatment aggregate, in particular the roof-drying nozzle, in order to store a larger or more complex signaling device. The signaling device, however, does no longer need to be protected so very carefully because it can be moved with the roof nozzle during the washing operation upwardly into a relatively spray-safe position.

The signaling device can have various designs. It is in the preferred exemplary embodiment a switchable optic indicator directed toward the vehicle operator. The subclaims disclose different design possibilities for this. The operator guide can in this manner transmit better, more extensive and more goal-oriented informations than up to now to the vehicle operator. It is thereby possible to use instead of the optic indicator a different form of signaling, for example spoken informations.

The signaling device of the invention permits in particular to instruct the vehicle operator when driving into the vehicle washing installation fully with detailed instructions. The signaling device can during operation also transmit other types of informations to the vehicle operator, for example, exiting instructions, informations regarding the scope and actual state of the vehicle treatment, advertisement informations, etc.

BRIEF DESCRIPTION OF DRAWINGS

The invention is exemplarily and schematically illustrated in the drawings, in which.

DESCRIPTION OF PREFERRED EMBODIMENT

Figure 1:
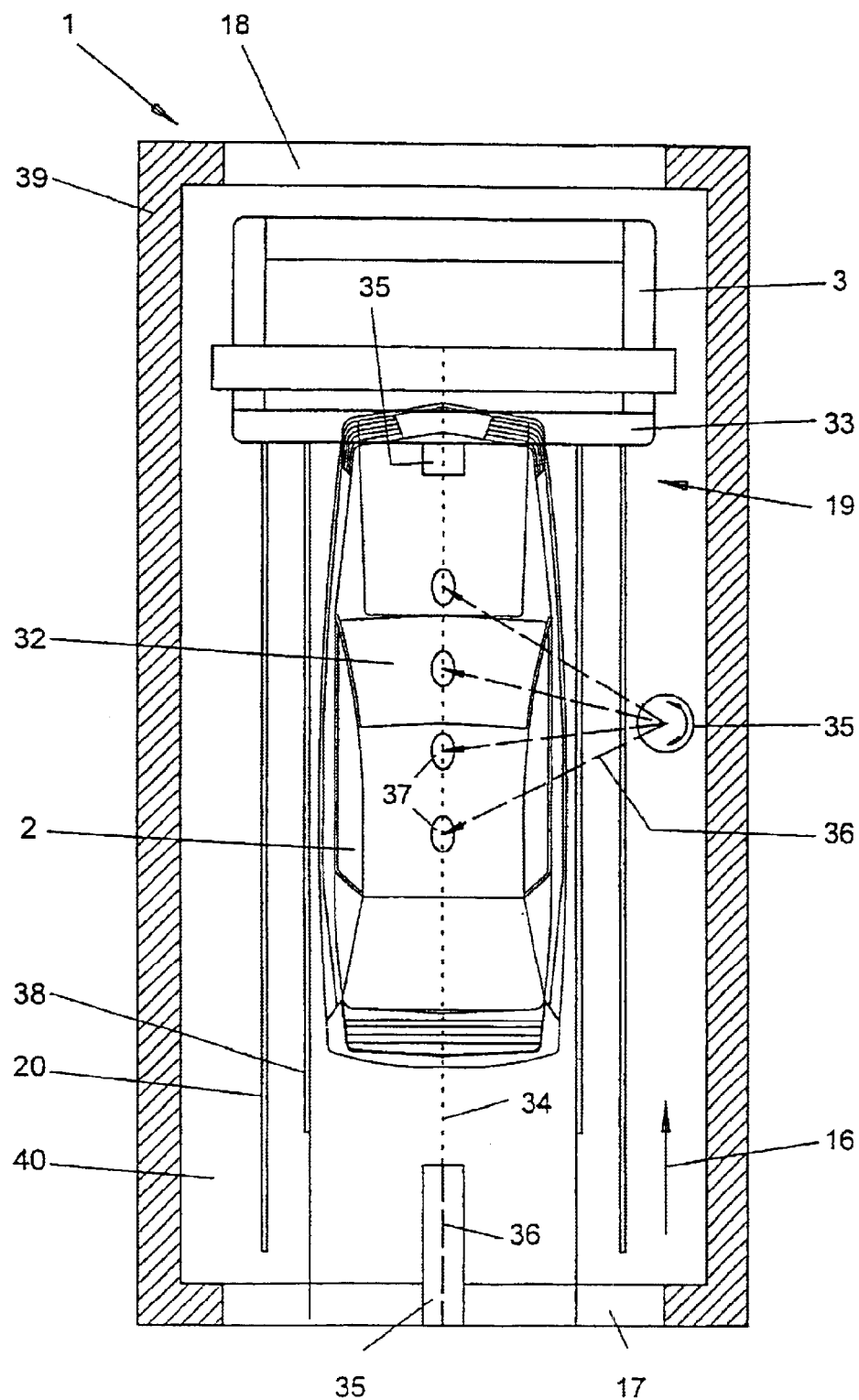
FIG. 1 is a top view of a vehicle washing installation comprising a passive drive-in aid utilizing an optic guide beam.

FIGS. 1 to 6 illustrate a treatment installation (1) for vehicles (2) comprising an optic drive-in aid (19). The treatment installation (1) can be designed as desired. The illustrated embodiment is a vehicle washing installation. Alternatively it may also be a polishing installation or any similar installation.

The vehicle washing installation (1) is schematically illustrated in FIGS. 1 to 6. It consists of one or several portals (3), in which among others a washing device (4) and a drying device are housed. The portals are in the illustrated embodiment designed conventionally in a U-shape and travel along stationary rails (20). Alternatively it is also possible for the portal or the portals (3) to travel along elevated or above-the-ground rails like an overhead crane or the like. The washing device (4) can have any desired design and can house spray devices for chemical products, rinse water, high-pressure nozzles, roof and side brushes or similar other aggregates. The drawings show for clarity purposes only wheel-washing brushes.

The drying device houses at least one raisable and lowerable roof-drying nozzle (6). In addition one or several movable or stationary side nozzles can be provided. The roof-drying nozzle (6) can alternatively also be rigidly arranged. It has in the preferred embodiment a vertical guide in the portal (3) and a lifting drive. Furthermore it is possible to provide light barriers and similar control elements for the roof-nozzle movement.

The vehicle washing installation (1) is in the illustrated embodiment stored as a portal washing installation in a washing bay (39), which has a floor (40), a ceiling or a roof (41), an entry (17) and, if necessary, an oppositely positioned exit (18). The portal (3) equipped with all necessary aggregates moves hereby relative to the stationary vehicle (2). The vehicle (2) is driven by the vehicle operator onto a drive-in track (21) in drive-in direction (16) in front of or under the stationary portal (3). The vehicle (2) can after having been washed leave the installation (1) either by moving forward or backward depending on the design of the installation.

The vehicle washing installation (1) can be designed alternatively as a tandem or cycle installation. In the case of a tandem installation two portals are provided which are set up one behind the other and are equipped with different aggregates. The portals can move separately or together. In the case of a cyclical installation two or more portals are also arranged one behind the other and are separated into different treatment areas by a movable intermediate wall. The vehicle operator drives the vehicle after the first treatment operation has ended under the next portal. The vehicle can also be moved via a tugging device. It is also possible to mix these types of installations. The vehicle washing installation (1) can basically be designed as desired.

Figure 2:
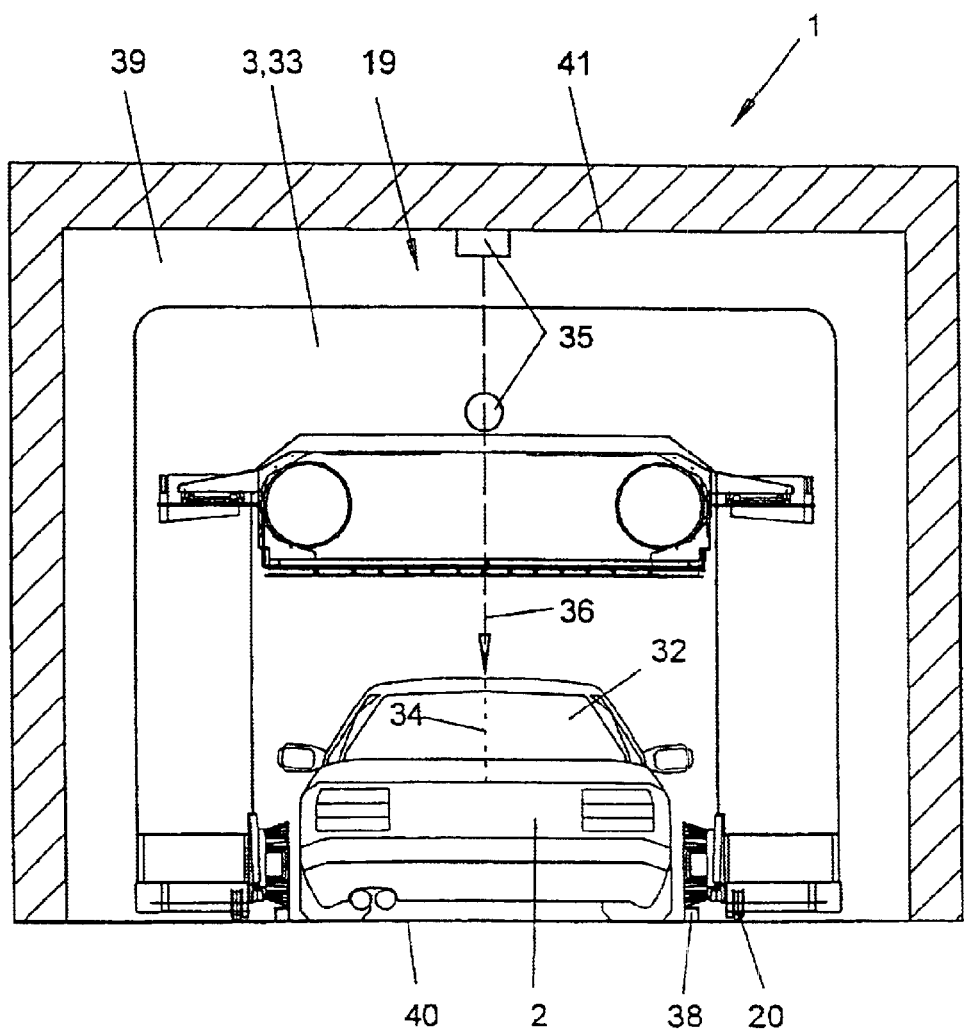
FIG. 2 is a front view of the arrangement of FIG. 1.

The vehicle washing installation (1) has a drive-in aid (19), which in the exemplary embodiment of FIGS. 1 and 2 is designed as a passive drive-in aid and in the modification of FIGS. 3 to 6 as an active drive-in aid. The passive drive-in aid (19) works with at least one optic guide line (34). The active drive-in aid (19) has one or several measuring devices (12, 13) and one signaling device (7) with travel-direction instructions (10) to guide the vehicle operator.

The passive optic drive-in aid (19) illustrated in FIGS. 1 and 2 enables the vehicle operator to drive correctly along the drive-in direction (16) into the installation (1) and to park the vehicle in front of our under the portal (3). The drive-in aid (19) has for this purpose a device which produces one or several optically visible guide line(s) (34) in front of the vehicle operator. Using these guide lines (34) the vehicle operator can determine whether he is driving with a lateral shift too far to the left or too far to the right or possibly even also at an angle and can accordingly countersteer.

The washing installation (1) can in this design have in a conventional manner mechanical guide rails (38) on the floor (40) for the vehicle wheels. However, these can also be eliminated in the preferred embodiment because of the optic drive-in aid (19).

One single guide line (34) is in the illustrated embodiment aligned essentially along the drive-in direction (16). Furthermore it is aligned preferably in the area of the steering wheel of the vehicle. A good guiding action is achieved when the guide line (34) extends approximately centrally with respect to the steering column. Alternatively it is possible to arrange the guide line (34) according to the drawings of FIGS. 1 and 2 essentially centrally with respect to the installation (1).

The optic guide line (34) can be produced in various ways. In the preferred embodiment, it is projected from above onto the vehicle (2) and/or onto the floor (40) of the installation. It can in this manner be seen in every drive-in position in the installation (1) by the vehicle operator.

The drive-in aid (19) has in the preferred embodiment one or several optic beam producers (35), for example lamps, laser devices or the like, which produce a concentrated light beam, in particular a laser beam or the like. FIGS. 1 and 2 show here various embodiments as modifications in the same drawings.

The optic guide line (34) extends preferably from the entry (17) to the correct parking position under the portal (3). However, as an alternative, it can also extend to the end of the bay or to the exit (18). The guide line (34) can be created as a full line or also as a dotted line. The line or its dots can also have any desired geometric forms, symbols or the like.

One or several beam producers (35) are in the simplest embodiment arranged on the ceiling (41) of the bay and/or on the overhead crown (33) of the portal (3), which beam producers direct a beam (36) vertically or inclined downwardly. The beam producers (35) can thereby be movably arranged so that the beam (36) wanders back and forth along the desired guide line (34). When the beam moves suitably quickly, the lazy eye sees the impact dots as a line (34). Similarly it is also possible that several beam producers (35) are arranged one after the other preferably centrally and above the desired guide line (34), and mark with the impact dots of their beams (36) the guide line (34) dot-like or line-shaped.

FIG. 1 illustrates yet a further modification which, for example, has a laterally arranged and rotating beam producer (35), the beams (36) of which are diverted downwardly by suitable reflecting devices (37), for example mirrors, in order to produce the guide line (34). The producer can, for example, be a rotating laser head with a health-conscientious light intensity.

The beam producers (35) can in a further modification also be arranged at any other desired spot, for example near the floor or in the wall of the bay, whereby the beams (36) are deflected through suitable mirrors (37) or the like. Also it is possible to arrange one or several beam producers (35) at the entry (17) which emit beams (36) in drive-in direction (16). An arrangement is also possible at the end of the bay and the exit (18), whereby the beam projection is directed without glare from the front against the vehicle (2).

Through the preferred projection of the beams (36) or of the guide line (34) produced by said beams from above onto the vehicle (2), it is possible for the vehicle operator in his vehicle to see the guide line (34) on the hood of the car and also on his windshield (32). Since most vehicles are designed center-symmetrically, he can using the symmetry also determine whether the guide line (34) lies outside of the center of the vehicle or is inclined with respect to the longitudinal line of the vehicle and can correct the steering turn accordingly.

The optic guide line (34) can, if necessary, also be utilized for determining and signaling the drive-in distance. IT can for this purpose be suitably limited in the longitudinal extent. When the guide line (34) is no longer visible at the front end of the hood of the car, the drive-in position has been reached.

The drive-in aid (19) or the beam producers (35) can be turned on and off in a controlled suitable manner. Through a drive-in sensor, for example, a light barrier, an induction loop, an approximation feeler or the like, they are, when a vehicle (2) drives in, automatically turned on and are, after a predetermined time or upon reaching a correspondingly final controlled vehicle position, automatically again turned off.

In further modifications of the illustrated embodiments, it is possible for the guide line (34) to be created also, for example, stationarily in the floor (40) of the installation by a band of lights. In a further modification, it is possible to provide instead of one also several optic guide lines (34) which extend, for example, parallel side-by-side. A further modification provides for several dot-shaped light sources which produce also only one light dot on the front portion of the vehicle (2) or on the floor (40) of the installation, whereby these dots wander optically with the movement of the vehicle relative to the stationary light sources.

Several guide lines can in a further modification be projected in the form of complex images in front of the vehicle operator, for example on the windshield. These images can deliver three-dimensional optic effects and can provide the vehicle operator, for example, with a type of drive-in direction with a three-dimensional effect. Such multi-dimensional and virtual images can, for example, be produced with one or several suitable laser devices. Also any other suitable projection devices can be used.

The active drive-in aid (19) illustrated in FIGS. 3 to 6 has one or several measurement devices (12, 13) and one control system (14) to determine and evaluate the position and alignment (30) of the vehicle (2) when driving into the vehicle treatment installation (1). The signaling device (7) and the travel-direction instructions (10) are suitably controlled by the control system (14).

The signaling device (7) can in a suitable manner optically and/or acoustically guide the vehicle operator. The travel-direction instructions (10) give thereby to the vehicle operator, when the vehicle is not correctly positioned (30), correcting and steering aids to maintain the mostly center drive-in ideal line (29) and for the correct drive-in direction. Moreover, the signaling device (7) can transmit further informations, for example, for the actual vehicle position or for the stretch yet to be traveled forward, etc.

Figure 3:
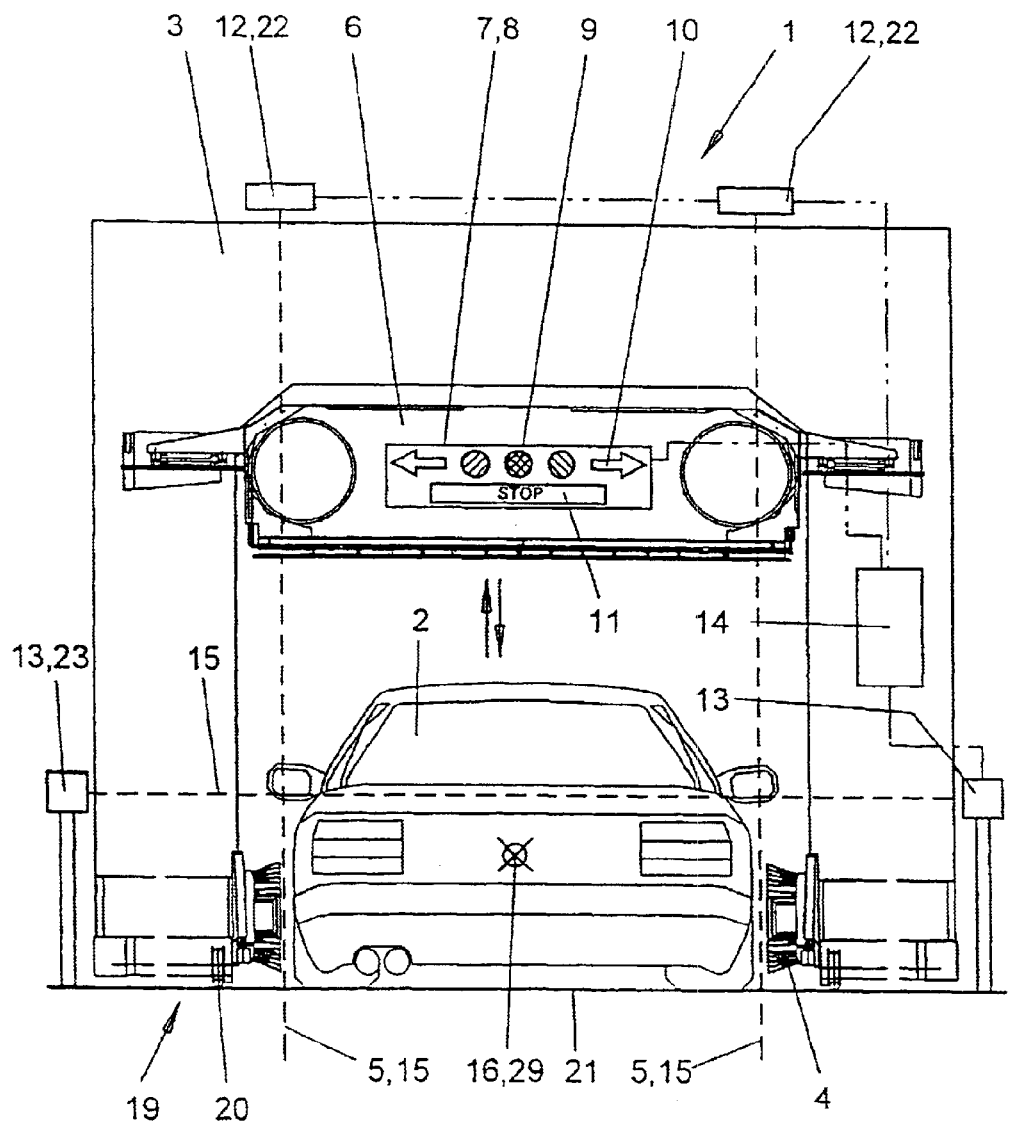
FIG. 3 is a front view of a vehicle washing installation comprising an active drive-in aid with optic sensors.
Figure 4:
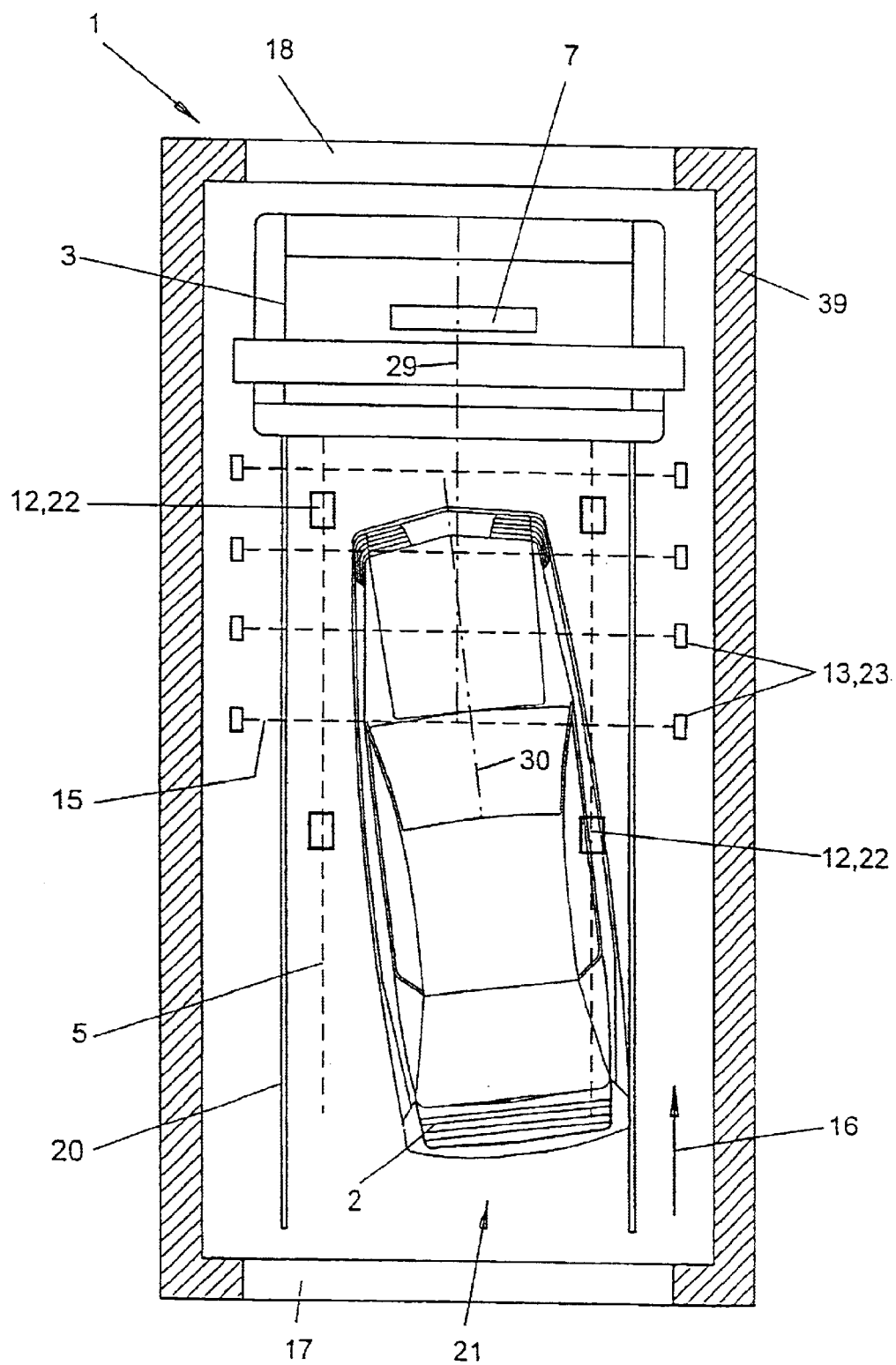
FIG. 4 is a top view of the arrangement of FIG. 3.

Several measurement devices (12, 13) are provided in the embodiment of FIGS. 3 and 4, which measurement devices are designed as non-contact sensors (22, 23), in particular as optic sensors. These can, for example, be light barriers, infrared light scanners or the like.

As is made clear in FIG. 3, the measurement devices (12) or the sensors (22) have an essentially vertical detection direction (15). Furthermore several measurement devices (13) or sensors (23) are arranged with one essentially horizontal detection direction (15). The sensors (22, 23) are arranged in pairs on both sides of the drive-in track (21) and at spaced intervals in front of the portal (3). They are provided outside of the range of movement of the portal and are positioned in a suitable manner stationarily in the vehicle washing installation, for example, through frames fastened on the floor, through a direct fastening on the walls of the bay, the ceiling of the bay or in any other suitable manner.

The measurement devices (12) with the vertical detection device (15) are preferably aligned with the longitudinally extending edge interruption areas (5) of the portal (3). These edge interruption areas can be fixed in any desired manner corresponding with the design of the portal (3) or the treatment devices (4, 6). As shown in FIG. 3, these vertical edge interruption planes (5) extend, for example, with a slight distance within the washing brushes in rest position. If necessary, also the lateral drying nozzles or the high-pressure nozzles (not illustrated) can define the inner vertical edge interruption plane and its position relative to the drive-in track (21). An edge interruption plane is created above the path of travel of the portal (3) along the drive-in direction (16). The sensors (22) of the measurement devices (12) are preferably arranged in this edge interruption plane, whereby their detection direction (15) extends essentially in this plane. FIG. 4 clearly shows this position. For example four sensors (12) are here arranged each in two pairs.

With the vertically detecting measurement devices (12) it is possible to determine skewed positions or a lateral shift of the vehicle (2) already during the driving in and prior to reaching the final position at the portal (3). FIG. 4 shows this in connection with a skewed position (30) of the vehicle (2). The right rear of the vehicle projects here into the edge interruption plane (5) and could collide with the portal (3) or its parts during the washing operation. The rear sensor (12) positioned in the rear area detects the vehicle parts lying in its beam range (15). The three other sensors (12) do not detect any vehicle parts and communicate a normal operating state. These incoming sensor signals are evaluated in the control system (14), whereby the illustrated skewed position (30) is detected.

When such incorrect positions of the vehicle (2) during driving in are detected, the necessary correcting aid is determined in the control system (14) based on the signal evaluation and a suitable program, and is signaled to the vehicle operator via travel-direction instructions (10). He receives for this purpose an acoustic, optic or otherwise suitable signal that he is supposed to turn the steering wheel in the exemplary embodiment to the right in order to again correct the lateral shift and the skewed position, and to return to the correct drive-in ideal line (29). As soon as the steering aid becomes active and the vehicle has again the correct position, the correction instruction is cancelled.

Should the vehicle operator park the vehicle (2) in an incorrect position, the control system (14) transmits a corresponding instruction to the vehicle operator through the signaling device (7). Furthermore it is possible for the control system (14) to stop the vehicle washing installation (1) and to prevent the start of the portal (3) and of the treatment devices (4, 6).

The vertically detecting measurement device (12) can aside from the illustrated skewed position also detect a mere lateral shift of the vehicle (2) relative to the ideal line (29) during an otherwise straight vehicle alignment. The two right sensors (12) are then, for example, covered and detect vehicle parts. It may also be possible for extreme skewed positions to occur, during which three sensors react.

Deviating from the illustrated embodiment it is also possible to provide in place of the four sensors (12) or measurement devices (12) more or less of those measurement devices, which in addition may also vary in design and arrangement. For example, it is possible to arrange in place of the illustrated distributed individual sensors sensor bars in a singular or multiple arrangement along the edge interruption planes (5) or to have these extend transversely over the drive-in track.

The sensors (22) are in the illustrated exemplary embodiment designed as infrared light scanners arranged at a distance above the vehicle (2) and the installation floor. They radiate with a narrow cone preferably vertically downwardly. This design is particularly safe in operation and is not complicated in construction and is inexpensive. Without a vehicle or with a correctly driven-in vehicle they detect only the bottom of the vehicle in the edge interruption area (5). They have for this purpose been suitably aligned and dimensioned during the installation of the drive-in aid (19).

The sensors (22) function, for example, as spacing meters, which determine through a light reflex whether a portion of the vehicle (2) moves into the beam range (15) and is spaced at a smaller distance from the sensor (22) than the floor of the installation.

The measurement devices (12) or the sensors (22) can as an alternative also be designed and positioned in any desired other suitable manner. For example, capacitive or inductive scanners or light barriers can be used. Also it is possible to provide in place of the operatively safe light scanners, which are arranged on top, scanning devices which are arranged on the floor, for example, pressure sensors in the floor of the installation or light scanners on the floor.

The embodiment of FIGS. 3 and 4 provides furthermore one or several, preferably laterally positioned measurement devices (13) with an essentially horizontal detection direction (15). These are also provided in pairs on both sides of the drive-in track (21) and at intervals from the portal (3). They are preferably arranged on suitable frames on the floor and are designed in a suitable manner as non-contact sensors (23). These are light barriers in the illustrated embodiment. Any other suitable sensors (23) are possible as an alternative.

The horizontally operating measurement devices (13) detect the vehicle advance in drive-in direction (16). They are for this purpose arranged at a suitable height in order to be able to scan at least the front and the front side areas of the vehicle (2). The signals of the measurement devices (13) can be combined with the signals of the vertically detecting measurement devices (12) in the control system (14). Thus the position of the vehicle can be determined even better yet and more precisely. In particular it can also be derived from the values for the control system (14) how severe the incorrect position is and how extensive the corresponding correction aids and steering-wheel turns must be. With a correspondingly designed signaling device (7) it is possible to give correspondingly gradually staged steering instructions.

Figure 5:
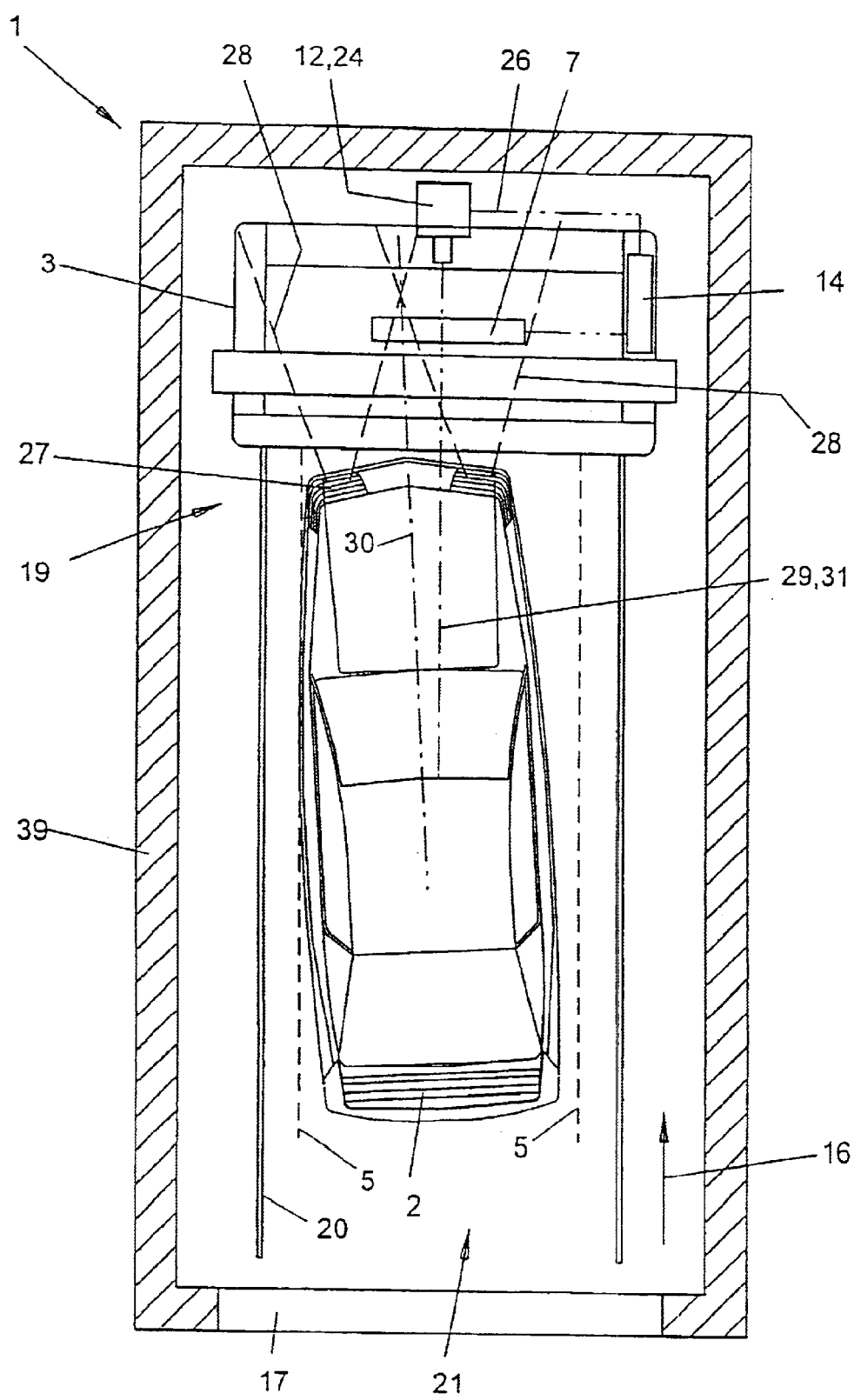
FIG. 5 shows a modification of FIG. 4 utilizing a camera.
Figure 6:
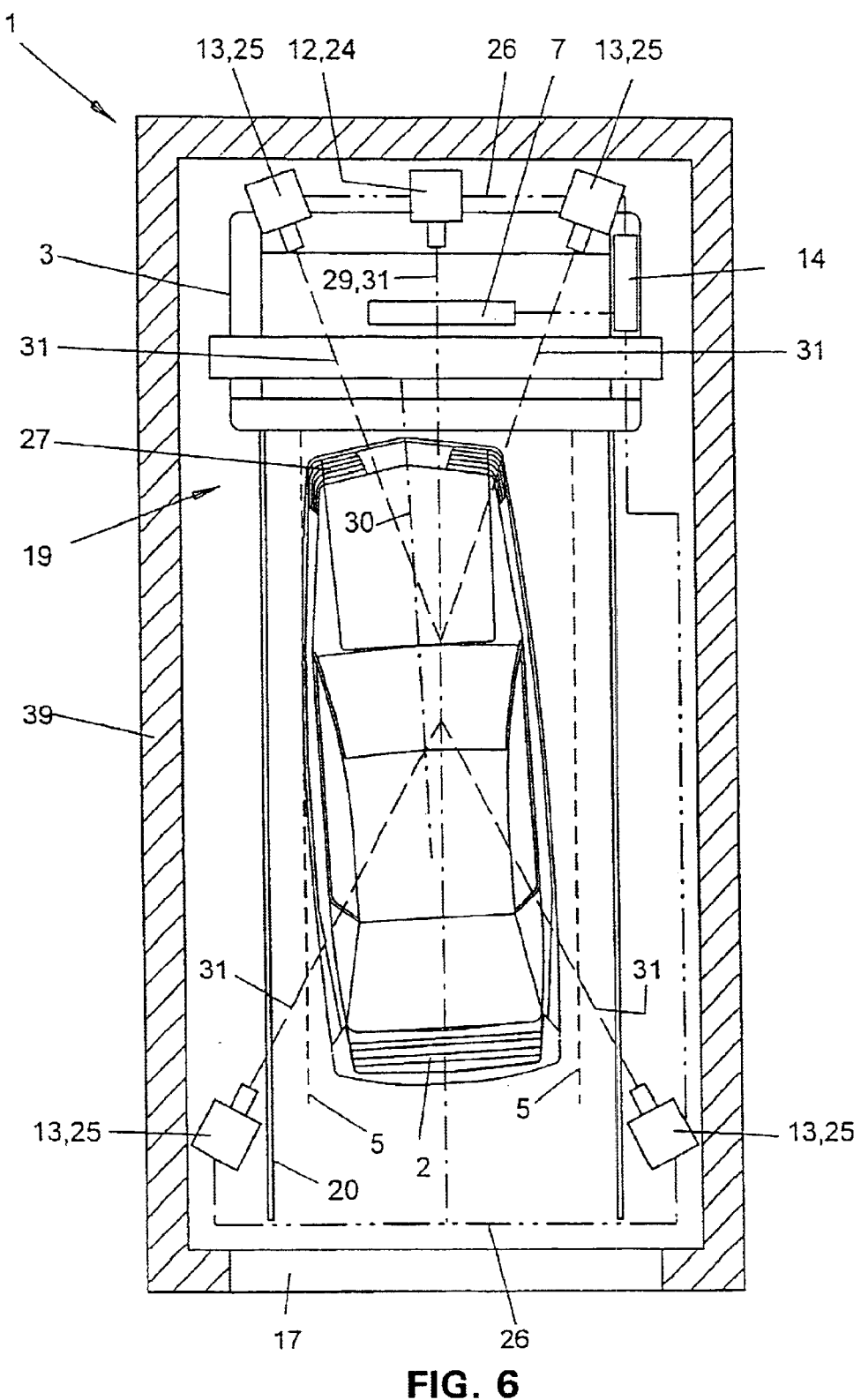
FIG. 6 shows a further modification with several cameras.

FIGS. 5 and 6 illustrate a modification of the active drive-in aid (19) with a different design and arrangement of the measurement devices (12, 13). The measurement devices (12, 13) are here designed as optic detection systems (24, 25) and in particular as camera systems or so-called vision systems. The optic detection systems (24, 25) are more complex than the simple sensors (22, 23) in the exemplary embodiment of FIGS. 3 and 4. The cameras (24, 25) have a greater information density and can take a picture of the vehicle (2) driving in. It is thereby determined by evaluating the optic informations whether the vehicle is or is not in the desired position within the picture of the camera. When compared to the desired position a lateral shift or a turn exist, this can be determined in the control system (14) or also in the optic detection system (24, 25) and can be calculated according to position and magnitude. The optic detection systems (24, 25) are for this purpose positioned at a known place and with a known line of sight (31).

The cameras (24, 25) have in a simple design a low resolution and detect essentially only the turned-on lights (27) or the cone-like light pattern (28) of the vehicle (2). driving in. They are detected as two bright points of light distinguished over the lighter surroundings. The centerpoint of the vehicle can be calculated from the position of the headlights (27) and a possible lateral deviation from the specified drive-in ideal line (29) can be determined. By storing and comparing the headlight positions, which change during driving in, it is also possible to determine the direction of travel of the vehicle (2). In addition it is also possible to determine via the optic detection device (24, 25) the distance of the vehicle (2) from the final point on the portal (3). In connection with the low resolution there exist lower demands regarding the calculating capacity of the control system (14). Accordingly it is possible to keep the expense regarding hardware and software low.

With more complex and higher resolving cameras (24, 25), it is possible to also take more complex pictures of the vehicle (2), and in particular it is possible to optically detect and scan the borders of the vehicle chassis. These picture data can be utilized in the above-mentioned manner for evaluating the position and alignment (30) of the vehicle (2). Moreover, the detected contour data of the vehicle (2) can also be utilized for controlling the washing and polishing device (4) and the portal (3). Thus washing brushes can be exactly controlled according to the position and the contour of the vehicle (2). In a similar manner it is also possible to control high-pressure washing nozzles, application devices for water, rinsing agents, foam, cleaning agents, etc. and drying nozzles in the roof area and on the sides of the vehicle. Furthermore a visual monitoring of the washing or polishing operation can be carried out through the optic detection systems (24, 25) by connection to a monitoring system, for example a monitor, a recording device, etc. Possible collisions, insufficient washing or polishing results, etc. can be detected in this manner, and can at least be recorded or can be evaluated, if necessary, also for correction and a renewed washing or polishing operation. Furthermore it is possible through the visual monitoring to optimize, for example, brush positions with respect to difficult vehicle contours, for example retracted sun roofs and to adapt these to each vehicle shape. These functions can be advantageously utilized also without the function as a drive-in aid.

The exemplary embodiment of FIG. 5 provides one single camera (24) as the measurement device (12), which is preferably rigidly arranged and is positioned essentially in the drive-in ideal line (29). Its line of sight (31) is directed onto the drive-in track (21) or the vehicle (2) and extends along the ideal lines (29). The camera (24) is preferably arranged approximately at the height of the cooler grill. It is provided at the rearward end of the vehicle treatment installation (1) and can be arranged below or behind the portal (3). The camera (24) can have in the aforementioned manner a low resolution and can detect the headlights (27). It can, however, as an alternative also be designed as the mentioned complex vision system to detect the entire vehicle contour.

The individual camera (24) can determine in the aforedescribed manner lateral incorrect positions of the vehicle (2) relative to the ideal line (29). By storing and comparing the received position data of the vehicle (2) it is, however, also possible to determine skewed positions (30) of the vehicle (2) driving in.

FIG. 6 illustrates a modification in which several measurement devices (12, 13) and several optic detection systems (24, 25) are provided. The center camera system (24) arranged in the ideal line (29) is the same as the one in FIG. 5. In addition further cameras (25) are positioned around the drive-in track (21) or the driven-in vehicle (2). These can be, for example, two cameras (25) as shown in FIG. 6 arranged on both sides next to the center camera (24), and which are each directed with their lines of sight (31) inclined onto the drive-in track (21) or the vehicle (2). Alternatively or in addition it is possible to arrange two further cameras (25) near the entry (17), which cameras are each positioned on the sidewalls or in the corner of the vehicle treatment installation (1), and which are directed with their lines of sight (31) from the rear onto the vehicle (2) in the final position.

The individual camera (24) is in the exemplary embodiment of FIG. 5 connected through a suitable line, preferably a videobus (26) to the control system (14). All five cameras (24, 25) are in the exemplary embodiment of FIG. 6 connected through a videobus (26) to the control system (14). Preferably one single videobus (26) is hereby provided which also connected the individual cameras (24, 25) among one another.

The cameras (24, 25) can be installed stationarily and rigidly. They have a known position and a specified fixed line of sight (31). Alternatively or in addition it is possible for individual or all cameras (24, 25) to be arranged also movably or movably within themselves, for example rotatably or pivotally. This can be advantageous for detecting the lateral shape or height contour of a vehicle during its driving into the installation (1). The length and height and the contour of the vehicle (2) over the hood of the engine, roof, rear area and windshield is hereby detected, stored and is utilized for a suitable evaluation with the aforedescribed possibilities. When movable cameras (24, 25) are used, a suitable measuring system for detecting the movements and for a corresponding evaluation or correction of the camera measurement data can be provided.

The signaling device (7) is stored in the illustrated exemplary embodiments in the portal opening under the crossbeam. It is preferably arranged on the roof-drying nozzle (6) and is directed toward the vehicle operator. In the case of an elevationally movable roof-drying nozzle, the signaling device (7) is moved through the nozzle movements into the range of vision of the vehicle operator and again removed therefrom. It can, however, as an alternative also be arranged on the portal (3) or on any other suitable area of the vehicle treatment installation (1).

The signaling device (7) can have various designs. The exemplary embodiment shows a switchable optic indicator (8). This indicator houses, for example, a colored light signal (9) with one or several lights of various colors. Using the colors red/green the vehicle operator can, for example, be signaled how far he can yet drive forward relative to the portal (3).

The signaling device (7) has one or several travel-direction instructions (10) which can be designed in any desired suitable manner. In FIG. 3 these are switchable, in particular illuminatable direction arrows (10). They point, for example, to the left and right and signal to the vehicle operator the direction which he must turn the steering wheel in order to achieve the correct parking position at the portal (3). The arrows can also be directed upwardly or downwardly and indicate to the vehicle operator how far he must still pull forward. Furthermore the arrows for indicating the magnitude of the necessary turn of the steering wheel can be designed as multiple arrows or can have a color change with the warning color red and other colors.

The signaling device (7) can alternatively or in addition have one or several switchable signs (11). The vehicle operator can receive optically any desired text through these signs. Aside from text, it is also possible to signal images or symbols. The sign (11) enables through a moving light displaying a complete operator guide with complete texts giving informations or instructions. It can function as travel-direction instruction. The transmitted informations can also be of any desired content. Aside from the aforementioned drive-in instructions (10), it is, for example, also possible to transmit informations regarding the washing offer, the price, regarding advertisement or the like.

The operator instructions cannot only be given during driving in and during parking of the vehicle. A transfer of informations is also possible during the washing process or at its end during exiting. It is, for example, possible to signal during the washing operation the scope of the selected washing operation and the state of the individual treatment operations. After the wash has been completed the vehicle operator receives exiting instructions, advertisement offers, a thank you or the like. The instructions transmitted by the signaling device (7) can basically be of any desired nature.

Aside from the aforementioned optic indicator (8), it is also possible as an alternative or in addition to provide any other type of indicator, for example an acoustic indicator. Same consists of a loud-speaker device, with which spoken instructions, music and other acoustic informations are transmitted. The acoustic indicator can also house an alarm buzzer, a siren or the like.

The control system (14) is preferably designed as a computer-supported, freely programmable control system. The signaling device (7) is also connected to the control system (14) and receives from same the control signals for operating the individual indicating elements. Lights can hereby be switched on and off, displays can be generated or other switching operations can be switched off. If necessary, the indicating elements of the signaling device (7) are also movable and can be rotated, tilted or can be changed in a different manner in position or appearance.

To exercise the signalizing function, the roof-drying nozzle (6) carries out independent movements. The roof-drying nozzle (6) is during drive-in readiness and when the vehicle washing installation (1) is ready to operate lowered so far that the signaling device (7) is in an ergonomically favorable visual range in front of the vehicle operator. The vehicle operator can thus during driving in look forward in the usual manner and finds in his visual range the necessary operating instructions and informations. After the vehicle has been positioned and prior to the start of the washing process, the roof-drying nozzle (6) travels again upwardly into the rest position in which it is also protected against spray water. The signaling device (7) can in this position be out of sight or covered.

The roof-drying nozzle (6) can at the end of the washing process be lowered again and can indicate to the vehicle operator with the signaling device (7) being switched on the end of the washing process and the readiness to exit. When exiting to the rear through the exit (18) occurs, the roof-drying nozzle (6) is again lifted earlier in a timely fashion in order to avoid collisions with the vehicle (2). This can, for example, be done by an approximation sensor, a preset time-delay circuit or other similar suitable measure.

A modification of the illustrated exemplary embodiments of FIGS. 1 to 6 makes also possible a combination of the passive and active drive-in aid (19). The passive drive-in aid (19) can be combined with a measurement device (12, 13), whereby the optic guide line (34) operates in addition as the signaling device (7). Signals can then be transmitted through the guide line (34) to the operator of the vehicle in such a manner that, for example, the beam producers (35) pulsate and the beams (36) or the guide line (34) formed by the beams blink or show other clear differences in brightness. Such optic effects can signal to the operator of the vehicle, for example, a dangerous situation, in case he does not correctly react to the guide line (34) alone, and makes steering errors during driving in. When projecting several guide lines or three-dimensional images with drive-in directions or the like, it is possible to change the projected guide lines or images also in dependency of the vehicle position and to bring through optic changes the operator of the vehicle to change his steering direction. The three-dimensional and optic drive-in direction or drive-in tunnel can then extend possibly at an angle fore the operator of the vehicle and can cause him to carry out a following steering movement.

The illustrated exemplary embodiments can be modified in various ways. The measurement devices (12, 13) can be varied in number, arrangement and design. In particular the horizontally operating measurement devices (13) can be eliminated. At any rate one single system is sufficient for a vision system with one or several cameras. The control and/or the signaling device can be coupled in a different technical circuit and in the local arrangement with the measurement device or the measurement devices (12, 13). The measurement devices and the indicator can also be possibly combined with one another. The measurement devices can aside from the position and alignment of the vehicle (2) also detect at least parts of its contour, in particular the contour of the side surfaces. These measurement data can be stored and can be evaluated and used in a suitable manner for a contour control of the treatment aggregates.

The signaling device can be arranged instead on the roof-drying nozzle on any desired other roof-treatment aggregate. This can, for example, be a horizontal high-pressure nozzle pipe, a spray pipe for applying foam, cleaning agents, etc., a rinsing pipe or the like. The roof-treatment aggregate can also be essentially stationarily arranged. It does not need to have a drive for lifting and lowering movements. The signaling device can in a further modification have a separate guide and a separate drive for the lifting and lowering movements so that they can be moved in the portal independently of the other treatment aggregates. The illustrated embodiment has compared to this, however, the advantage that for the movements of the signaling device an at any rate already provided aggregate together with the drive can be used.

LIST OF REFERENCE NUMERALS

1 Vehicle washing installation
2 vehicle
3 portal
4 washing device
5 edge interruption plane
6 roof-treatment aggregate, roof-drying nozzle
7 signaling device
8 optic indicator
9 signal
10 travel-direction instruction, direction arrow
11 sign
12 measurement device
13 measurement device
14 control system
15 detection device, beam direction
16 drive-in direction
17 entry
18 exit 19 drive-in aid
20 rail
21 drive-in track
22 sensor, lateral distance (spacing)
23 sensor, front position
24 optic detection system, camera
25 optic detection system, camera
26 videobus
27 headlight
28 light pattern
29 drive-in ideal line
30 vehicle alignment, skewed position
31 camera direction, line of sight
32 windshield
33 crown
34 optic guide line
35 beam producer
36 beam
37 reflecting device, mirror
38 guide rail
39 washing bay
40 floor
41 roof, ceiling

What is claimed is:

1. A vehicle treatment installation for at least one of washing and polishing a vehicle, comprising at least one portal and at least one signaling device for guiding an operator of the vehicle, the vehicle treatment installation including a drive-in aid device that transmits optic direction and correction instructions to the operator of the vehicle when driving into the vehicle treatment installation, the drive-in aid device including a control system and at least one camera arranged below or behind the portal and positioned in a drive-in ideal line with the line of sight toward the driving-in vehicle for detecting and evaluating the position and alignment of the vehicle when driving in, and wherein the signaling device for providing travel-direction instructions is connected to the control system.

2. The vehicle treatment installation according to claim 1, wherein the signaling device is arranged on a roof-treatment aggregate.

3. The vehicle treatment installation according to claim 1, wherein the signaling device includes one or several switchable direction arrows.

4. The vehicle treatment installation according to claim 1, wherein the signaling device includes one or several switchable signs.

5. A vehicle treatment installation for at least one of washing and polishing a vehicle, comprising at least one portal and at least one signaling device for guiding an operator of the vehicle, the vehicle treatment installation including a drive-in aid device that transmits optic direction and correction instructions to the operator of the vehicle when driving into the vehicle treatment installation, the drive-in aid device including a control system and several cameras arranged with varying lines of sight with respect to a drive-in track for detecting and evaluating the position and alignment of the vehicle when driving in, and wherein the signaling device for providing travel-direction instructions is connected to the control system.

6. A vehicle treatment installation for at least one of washing and polishing a vehicle, comprising at least one portal and at least one signaling device for guiding an operator of the vehicle, the vehicle treatment installation including a drive-in aid device that transmits optic direction and correction instructions to the operator of the vehicle when driving into the vehicle treatment installation, the drive-in aid device including a control system and at least one camera for detecting and evaluating the position and alignment of the vehicle when driving in by measuring light emitting from head lights of the vehicle, and wherein the signaling device for providing travel-direction instructions is connected to the control system.

7. A vehicle treatment installation for at least one of washing and polishing a vehicle, comprising at least one portal and a signaling device for guiding an operator of the vehicle, the vehicle treatment installation including a drive-in aid device that transmits optic direction and correction instructions to the operator of the vehicle when driving into the vehicle treatment installation, the drive-in aid device including non-contact sensors, wherein several of the non-contact sensors aligned in a horizontal detection direction and several of the non-contact sensors aligned in a vertical detection direction are arranged in pairs on both sides of a drive-in track at spaced intervals in front of the portal, and a control system for detecting and evaluating the position and alignment of the vehicle when driving in, and wherein the signaling device for providing travel-direction instructions is connected to the control system.

8. The vehicle treatment installation according to claim 7, wherein the sensors comprise optic sensors.

9. The vehicle treatment installation according to claim 7, wherein the sensors comprise light barriers or infrared light scanners.

10. A vehicle treatment installation for at least one of washing and polishing a vehicle, comprising at least one portal and at least one signaling device for guiding an operator of the vehicle that is arranged in the opening of the portal and capable of upward or downward movement, the vehicle treatment installation including a drive-in aid device that transmits optic direction and correction instructions to the operator of the vehicle when driving into the vehicle treatment installation, the drive-in aid device including a control system and at least one camera for detecting and evaluating the position and alignment of the vehicle when driving in, and wherein the signaling device for providing travel-direction instructions is connected to the control system.

11. Method for operating a vehicle treatment installation comprising at least one of a vehicle washing or polishing installation, the treatment installation having at least one portal and a signaling device for operational guidance for a vehicle driver so that visual direction and correction instructions are transmitted to the vehicle driver by a drive-in aid device when driving into the vehicle treatment installation, wherein the position and alignment of the vehicle when driving into the vehicle treatment installation is established and evaluated by at least one camera located under or behind the portal and positioned in an ideal drive-in line for viewing in the direction of the vehicle when driving into the treatment installation, whereby specific driving direction instructions and the correction instructions are transmitted by the drive-in aid device and the signaling device in the event of deviation from a predetermined position and alignment.

12. Vehicle treatment installation according to claim 11, wherein the camera is one of a plurality of cameras arranged in different viewing directions toward a drive-in track of the treatment installation.

13. Vehicle treatment installation according to claim 12, wherein the at least one camera detects and measures the location of illuminated headlamps of the vehicle.

14. Vehicle treatment installation according to claim 12, wherein the signaling device is located in an opening of the portal and guided and driven to be raised and lowered.

15. Vehicle treatment installation according to claim 12, wherein the signaling device is located on a roof treatment unit.

16. Vehicle treatment installation according to claim 12, wherein the signaling device includes at least one of: A) one or more switchable direction arrows; and B) one or more switchable text boxes.

17. Vehicle treatment installation according to claim 11, wherein the at least one camera detects and measures the location of illuminated headlamps of the vehicle.

18. Vehicle treatment installation according to claim 17, wherein the signaling device is located in an opening of the portal and guided and driven to be raised and lowered.

19. Vehicle treatment installation according to claim 17, wherein the signaling device is located on a roof treatment unit.

20. Vehicle treatment installation according to claim 17, wherein the signaling device includes at least one of: A) one or more switchable direction arrows; and B) one or more switchable text boxes.

21. Vehicle treatment installation comprising at least one of a vehicle washing or polishing installation, the treatment installation including at least one portal and a signaling device for operational guidance for a vehicle driver, the vehicle treatment installation including a drive-in aid device that transmits visual direction and correction instructions to the vehicle driver when driving into the vehicle treatment installation, wherein the drive-in aid device includes at least one camera located under or behind the portal and positioned in an ideal drive-in line for viewing in the direction of the vehicle driving into the treatment installation, and the treatment installation includes a control system for detecting and evaluating the position and alignment of the vehicle in response to an image from the at least one camera when the vehicle enters the installation, wherein the signaling device for providing operational guidance to the vehicle driver is connected to the control system.

22. Vehicle treatment installation according to claim 21, wherein the signaling device is located in an opening of the portal and guided and driven to be raised and lowered.

23. Vehicle treatment installation according to claim 22, wherein the signaling device is located on a roof treatment unit.

24. Vehicle treatment installation according to claim 22, wherein the signaling device includes at least one of: A) one or more switchable direction arrows; and B) one or more switchable text boxes.

25. Vehicle treatment installation according to claim 21, wherein the signaling device is located on a roof treatment unit.

26. Vehicle treatment installation according to claim 25, wherein the signaling device includes at least one of: A) one or more switchable direction arrows; and B) one or more switchable text boxes.

27. Vehicle treatment installation according to claim 21, wherein the signaling device includes at least one of: A) one or more switchable direction arrows; and B) one or more switchable text boxes.

* * * * *